US012581485B2

(12) United States Patent  
Wu et al.

(10) Patent No.: US 12,581,485 B2  
(45) Date of Patent: *Mar. 17, 2026

(54) METHOD, APPARATUS AND COMPUTER PROGRAM

(71) Applicant: NOKIA TECHNOLOGIES OY, Espoo (FI)

(72) Inventors: Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 229 days.

This patent is subject to a terminal disclaimer.

(21) Appl. No.: 18/095,344

(22) Filed: Jan. 10, 2023

(65) Prior Publication Data

US 2023/0164775 A1 May 25, 2023

Related U.S. Application Data

(63) Continuation of application No. 16/961,505, filed as application No. PCT/CN18/72298 on Jan. 11, 2018, now Pat. No. 12,075,404.

(51) Int. Cl.  
H04W 72/1268 (2023.01)  
H04W 72/23 (2023.01)

(52) U.S. Cl.  
CPC ....... H04W 72/1268 (2013.01); H04W 72/23 (2023.01)

(58) Field of Classification Search  
CPC ............. H04W 72/1268; H04W 72/23; H04W 72/569; H04W 28/0278; H04W 72/0446; H04W 72/21  
See application file for complete search history.

(56) References Cited

U.S. PATENT DOCUMENTS

| | | | |
|---|---|---|---|
| 2008/0019397 A1 | 1/2008 | Hou | |
| 2010/0110895 A1* | 5/2010 | Wu | H04W 28/06 370/328 |
| 2011/0039568 A1* | 2/2011 | Zhang | H04W 76/25 455/452.1 |
| 2011/0243106 A1 | 10/2011 | Hsu et al. | |

(Continued)

FOREIGN PATENT DOCUMENTS

| | | |
|---|---|---|
| CN | 101110676 A | 1/2008 |
| CN | 102326424 A | 1/2012 |

(Continued)

OTHER PUBLICATIONS

[99bis#42][NR UP/MAC]—NR Unit Replacement, R2-1713462, 3GPP TSG-RAN WG2 #100 (Nov.-Dec. 2017) 32 pages.

(Continued)

*Primary Examiner* — Dinh Nguyen  
(74) *Attorney, Agent, or Firm* — ALSTON & BIRD LLP

(57) ABSTRACT

There is disclosed a method comprising receiving at a user equipment an uplink grant for transmitting first uplink data from the user equipment at a first time; and determining a second time for initiating preparation of a transport block for transmitting the first uplink data, the determining a second time comprising subtracting a processing time for preparing the transport block from the first time.

27 Claims, 8 Drawing Sheets

(56) References Cited

U.S. PATENT DOCUMENTS

| | | | |
|---|---|---|---|
| 2012/0046043 A1 | 2/2012 | Jitsukawa | |
| 2013/0028223 A1 | 1/2013 | Kim et al. | |
| 2015/0223232 A1 | 8/2015 | Eriksson et al. | |
| 2016/0105849 A1 | 4/2016 | Chen et al. | |
| 2016/0360462 A1 | 12/2016 | Chockalingam et al. | |
| 2017/0086171 A1* | 3/2017 | Fliess | H04W 72/23 |
| 2017/0155477 A1 | 6/2017 | Kyo et al. | |
| 2017/0208610 A1 | 7/2017 | Tang et al. | |
| 2017/0353819 A1 | 12/2017 | Yin et al. | |
| 2018/0042014 A1 | 2/2018 | Wu et al. | |
| 2018/0070374 A1* | 3/2018 | Yi | H04W 72/23 |
| 2018/0255568 A1 | 9/2018 | Takeda et al. | |
| 2019/0150007 A1 | 5/2019 | Frenne et al. | |
| 2019/0313438 A1* | 10/2019 | Zhang | H04W 72/23 |

FOREIGN PATENT DOCUMENTS

| | | |
|---|---|---|
| CN | 104684102 A | 6/2015 |
| CN | 105577345 A | 5/2016 |
| EP | 3240350 A1 | 11/2017 |
| EP | 3319255 B1 | 5/2018 |
| EP | 3682685 A1 | 7/2020 |
| JP | 2015/213282 A | 11/2015 |
| RU | 2443059 C2 | 2/2012 |
| WO | WO 2013/154475 A1 | 10/2013 |
| WO | WO 2014/183558 A1 | 11/2014 |
| WO | WO 2016/175496 A1 | 11/2016 |
| WO | WO 2017/038532 A1 | 3/2017 |
| WO | WO 2017/172452 A1 | 10/2017 |
| WO | WO 2017/184049 | 10/2017 |
| WO | WO 2019/053515 A1 | 3/2019 |

OTHER PUBLICATIONS

3GPP TS 36.321 V15.0.0, 3rd Generation Partnership Project; Technical Specification Group Radio Access Network; Evolved Universal Terrestrial Radio Access (E-UTRA); Medium Access Control (MAC) Protocol Specification (Release 15) (Dec. 2017) 109 pages.

3GPP TS 38.213 V15.0.0, 3rd Generation Partnership Project; Technical Specification Group Radio Access Network; NR; Physical Layer Procedures for Control (Release 15) (Dec. 2017) 56 pages.

Clarification on BSR Trigger, Asustek et al., 3GPP TSG-WG2 Meeting #68 R2-097262 (Nov. 13, 2009) 3 pages.

Correction on SR Cancellation, R2-092780, Change Request, 3GPP TSG-RAN2 Meeting #66 (May 2009) 2 pages.

Correction to Cancellation of Triggered SR, R2-092582, Change Request, 3GPP TSG-RAN2#65bis meeting (Mar. 2009) 3 pages.

CQI/SRS/PMI/RI Transmission During Active Time, R2-086318, Change Request, 3GPP TSG-RAN2 Meeting #64 (Nov. 2008) 3 pages.

Decision to Grant for ARIPO Application No. AP/P/2020/012545 dated May 3, 2023, 5 pages.

Decision to Grant for Japanese Application No. 2020-538826 dated Jun. 22, 2022, 5 pages.

Decision to Grant for Russian Application No. 2020126677/07 dated Jun. 7, 2021, 12 pages.

Discussion of LCG and SR Configuration, HTC, 3GPP TSG-RAN WG2 #99 R2-1709420 (Aug. 25, 2017).

Ericsson, "HARQ Configurations in NR", 3GPP TSG-RAN WG2 #99bis, R2-1711177, (Oct. 9-13, 2017), 6 pages.

Extended European Search Report for European Application No. 18899468.5 dated Aug. 6, 2021, 7 pages.

Final Office Action for U.S. Appl. No. 16/961,505 dated Oct. 7, 2022.

First Examination Report for Indian Application No. 202027034205 dated Sep. 20, 2021, 6 pages.

Improvement of Cancellation of SR, Ericsson et al., 3GPP TSG-RAN2 Meeting #67 R2-095380 (Aug. 28, 2009), 2 pages.

International Search Report and Written Opinion for Application No. PCT/CN2018/072298 dated Sep. 27, 2018, 5 pages.

Nokia et al., "Clarification on PHR Timing for Configured Grant", 3GPP TSG-RAN WG2 Meeting #104, R2-1818759, (Nov. 12-16, 2018), 5 pages.

Nokia et al., "Clarification on TB Processing Time", 3GPP TSG-RAN WG2 NR Ad Hoc 1801, R2-1800583, (Jan. 22-26, 2018), 2 pages.

Non-Final Office Action for U.S. Appl. No. 16/961,505 dated Jan. 5, 2022.

Non-Final Office Action for U.S. Appl. No. 16/961,505 dated Jun. 23, 2023.

Notice of Acceptance for Chilean Application No. 2020-001849 dated Jul. 12, 2022, 2 pages.

Notice of Allowance for Korean Application No. 10-2020-7023057 dated Apr. 21, 2023, 2 pages.

Office Action and Search Report for Chile Application No. 202001849 dated Nov. 15, 2021, 11 pages.

Office Action and Search Report for Russian Patent Application No. 2020126677/07(046894) dated Dec. 15, 2020, with English translation, 11 pages.

Office Action for Algerian Application No. DZ/P/2020/000419 dated Jul. 2, 2021, 2 pages.

Office Action for ARIPO Application No. AP/P/2020/012545 dated Aug. 2, 2022, 4 pages.

Office Action for Australian Application No. 2018401438 dated Jun. 24, 2022, 3 pages.

Office Action for Australian Application No. 2022204562 dated Apr. 13, 2023, 3 pages.

Office Action for Canadian Application No. 3,088,218 dated Aug. 30, 2022, 3 pages.

Office Action for Canadian Application No. 3,088,218 dated Jul. 26, 2021, 3 pages.

Office Action for Chinese Application No. 201880091133.0 dated Oct. 24, 2022, 14 pages.

Office Action for Egyptian Application No. 1005/2020 dated Nov. 4, 2022, 8 pages.

Office Action for European Application No. 18899468.5 dated Aug. 11, 2022, 4 pages.

Office Action for European Application No. 18899468.5 dated Oct. 27, 2022, 5 pages.

Office Action for Japanese Application No. 2020-538826 dated Apr. 11, 2022, 5 pages.

Office Action for Japanese Application No. 2020-538826 dated Sep. 22, 2021, 7 pages.

Office Action for Japanese Application No. 2022-130940 dated May 26, 2023, 4 pages.

Office Action for Korean Application No. 10-2020-7023057 dated Sep. 26, 2022, 11 pages.

Office Action for Vietnam Application No. 1-2020-04603 dated Jun. 28, 2021, 2 pages.

Qualcomm Incorporated, "UL Data Transmission Procedures", 3GPP TSG RAN WG1 Meeting 91, R1-1720690, (Nov. 27-Dec. 1, 2017), 6 pages.

Qualcomm, "SR Configuration for URLLC Service", 3GPP TSG-RAN WG2 Meeting RAN2 #99, R2-1709121, (Aug. 21-25, 2017), 2 pages.

SR Triggering In Relation to Uplink Grants, R2-081468, 3GPP TSG-RAN WG2 #61bis (Apr. 2008) 3 pages.

Triggering of SR In Relation to Allocated Uplink Grants, R2-081016, 3GPP TSG-RAN WG2 #61 (Feb. 2008) 2pages.

Notice of Allowance for Singapore Application No. 11202006665Y dated May 5, 2023, 4 pages.

Office Action for Canadian Application No. 3,088,218 dated Aug. 1, 2023, 6 pages.

Office Action for Chinese Application No. 201880091133.0 dated Jul. 20, 2023, 12 pages.

Office Action for Colombian Application No. NC2020/0009849 dated Jun. 23, 2023, 24 pages.

Office Action for Egyptian Application No. 1005/2020 dated Jun. 6, 2023, 5 pages.

Office Action for Colombian Application No. NC2020/0009849 dated Mar. 22, 2024, 14 pages.

(56) References Cited

OTHER PUBLICATIONS

Notice of Issuance for Mexico Application No. MX/a/2020/007456 dated Mar. 8, 2024, 6 pages.
Decision to Grant for Japanese Application No. 2022-130940 dated Jan. 4, 2024, 4 pages.
Intention to Grant for European Application No. 18899468.5 dated Apr. 26, 2024, 9 pages.
Notice of Acceptance for Australian Application No. 2022204562 dated Aug. 21, 2023, 3 pages.
Notice of Allowance for Korean Application No. 10-2023-7038037 dated Jun. 2, 2025, 4 pages.
Office Action for Brazilian Application No. BR112020014302-2 dated Jun. 25, 2024, 8 pages.
Office Action for Canadian Application No. 3,088,218 dated May 22, 2024, 3 pages.
Office Action for Colombian Application No. NC2020/0009849 dated Dec. 17, 2024, 4 pages.
Office Action for Korean Application No. 10-2023-7038037 dated Jun. 18, 2024, 8 pages.
Office Action for Malaysian Application No. PI2020003592 dated Jun. 23, 2024, 3 pages.
Office Action for Mexico Application No. MX/a/2020/007456 dated Sep. 27, 2023, 6 pages.
Office Action for Thailand Application No. 2001003934 dated Feb. 20, 2024, 4 pages.
Office Action for Vietnamese Application No. 1-2020-04603 dated Aug. 26, 2025, 4 pages.
HTC, "Discussion on LCG and SR configuration", 3GPP TSG-RAN WG2 #99, R2-1709420, (Aug. 21-25, 2017), 2 pages.
Office Action for Indonesian Application No. P00202005815 dated Dec. 23, 2025, 6 pages.
Written Opinion for Singapore Application No. 10202301927T dated Jan. 31, 2026, 9 pages.

* cited by examiner

300

304

303

302

301

UE has some
data to
transmit but
no valuable
UL resources

Transmit SR
on PUCCH

Receive UL
grant for BSR

Transmit
BSR on
PUSCH

Receive
UL grant

Transmit
UL data 402        404        406        408        410        412

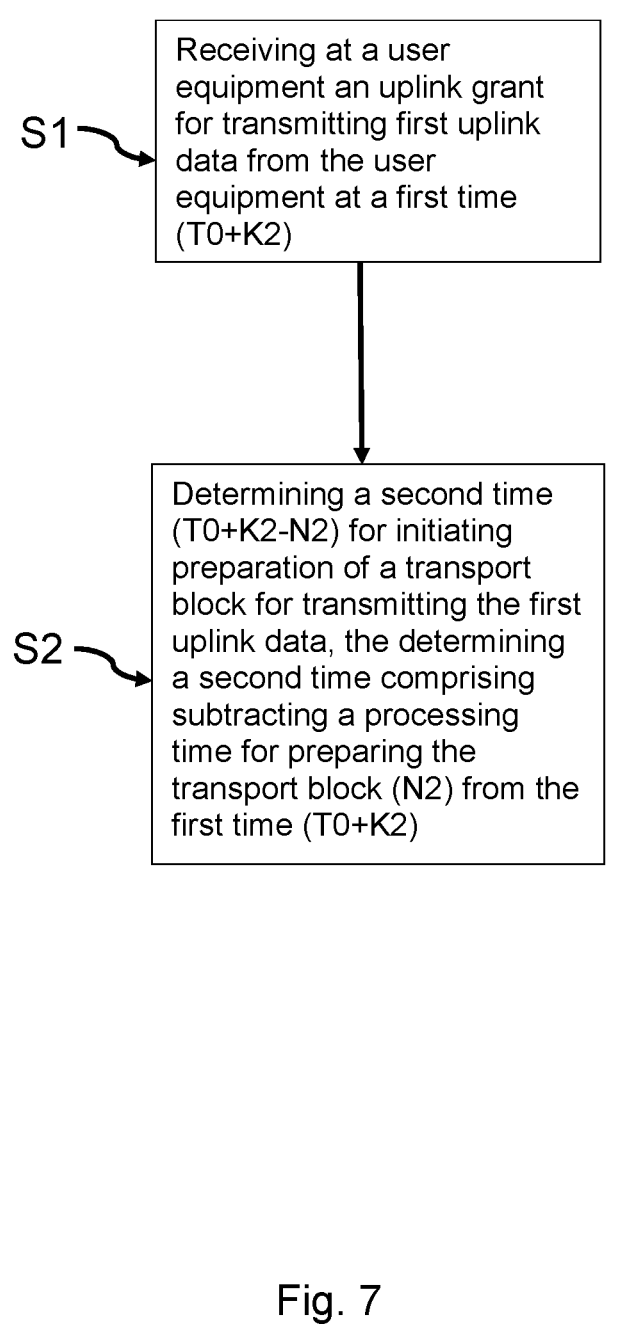

S1 → Receiving at a user equipment an uplink grant for transmitting first uplink data from the user equipment at a first time (T0+K2)

S2 → Determining a second time (T0+K2-N2) for initiating preparation of a transport block for transmitting the first uplink data, the determining a second time comprising subtracting a processing time for preparing the transport block (N2) from the first time (T0+K2)

Fig. 7

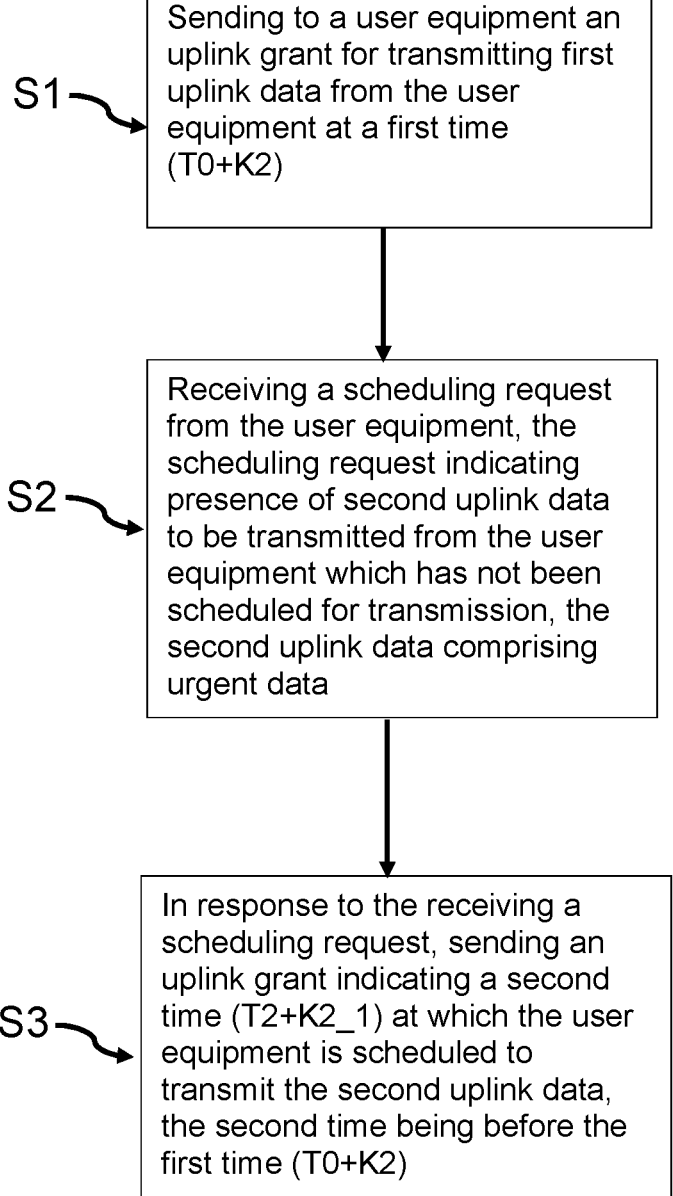

S1 — Sending to a user equipment an uplink grant for transmitting first uplink data from the user equipment at a first time (T0+K2)

S2 — Receiving a scheduling request from the user equipment, the scheduling request indicating presence of second uplink data to be transmitted from the user equipment which has not been scheduled for transmission, the second uplink data comprising urgent data S3 — In response to the receiving a scheduling request, sending an uplink grant indicating a second time (T2+K2_1) at which the user equipment is scheduled to transmit the second uplink data, the second time being before the first time (T0+K2)

Fig. 8

METHOD, APPARATUS AND COMPUTER PROGRAM

CROSS-REFERENCE TO RELATED APPLICATIONS

This application is a continuation of U.S. Non-Provisional patent application Ser. No. 16/961,505, filed Jul. 10, 2020 and entitled "Method, Apparatus and Computer Program," which is a national phase entry of International Application Serial No. PCT/CN2018/072298, filed Jan. 11, 2018 and entitled "Method, Apparatus and Computer Program," the entire contents of each of which are hereby incorporated herein by reference in their entireties for all purposes.

FIELD

This disclosure relates to communications, and more particularly to transmissions in a wireless communication system.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardized radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A).

Since introduction of fourth generation (4G) services increasing interest has been paid to the next, or fifth generation (5G) standard. 5G may also be referred to as a New Radio (NR) network. Standardization of 5G or New Radio networks is an on-going study item.

When a user equipment (UE) has data to transmit, the UE transmits a Scheduling Request (SR) so that the UE can be scheduled to transmit that data. The SR informs the scheduler in the base station (e.g. eNB or gNB) that the UE has uplink (UL) data to transmit. There may be problems associated with delays in sending the SR.

BRIEF SUMMARY

According to a first aspect there is provided a method comprising: receiving at a user equipment an uplink grant for transmitting first uplink data from the user equipment at a first time; determining a second time for initiating preparation of a transport block for transmitting the first uplink data, the determining a second time comprising subtracting a processing time for preparing the transport block from the first time.

According to an example the method comprises determining, at a third time which is between the receiving the uplink grant and the initiating preparation of a transport block, a presence of second uplink data to be transmitted from the user equipment which has not been scheduled for transmission, the second uplink data comprising urgent data and the presence of the second uplink data triggering a buffer status report, and in response to the buffer status report triggering a scheduling request from the user equipment.

According to an example the method comprises the second uplink data being stored in a buffer of the user equipment.

According to an example the method comprises, in response to the sending of the scheduling request, receiving an uplink grant indicating a fourth time at which the user equipment is scheduled to transmit the second uplink data, the fourth time being before the second time.

According to an example the fourth time is before the second time.

According to an example the method comprises determining the processing time for preparing the transport block based on a number of OFDM symbols associated with the transport block.

According to an example a time period between the second time and the first time being reserved for building of the transport block.

According to an example a time period between the first time and the second time comprises a network defined parameter.

According to a second aspect there is provided a method comprising: sending to a user equipment an uplink grant for transmitting first uplink data from the user equipment at a first time; and receiving a scheduling request from the user equipment, the scheduling request indicating presence of second uplink data to be transmitted from the user equipment which has not been scheduled for transmission, the second uplink data comprising urgent data; and in response to the receiving a scheduling request, sending an uplink grant indicating a second time at which the user equipment is scheduled to transmit the second uplink data, the second time being before the first time.

According to an example, a time period between the sending of the uplink grant for transmitting first uplink data and the second time comprises a network defined parameter.

According to a third aspect there is provided a computer program comprising program code means adapted to perform the steps of the first aspect when the program is run on a data processing apparatus.

According to a fourth aspect there is provided a computer program comprising program code means adapted to perform the steps of the second aspect when the program is run on a data processing apparatus.

According to a fifth aspect there is provided an apparatus comprising at least one processor, and at least one memory including computer program code, wherein the at least one memory and the computer program code are configured, with the at least one processor, to: receive an uplink grant for transmitting first uplink data from the apparatus at a first time; determine a second time for initiating preparation of a transport block for transmitting the uplink data, the determining a second time comprising subtracting a processing time for preparing the transport block from the first time.

According to an example, the apparatus is configured to determine, at a third time which is between the receiving the uplink grant and the initiating preparation of a transport block, a presence of second uplink data to be transmitted from the apparatus which has not been scheduled for transmission, the second uplink data comprising urgent data and the presence of the second uplink data triggering a buffer status report, and in response to the buffer status report the apparatus configured to trigger a scheduling request from the user equipment.

According to an example, the second uplink data is stored in a buffer of the apparatus.

According to an example the apparatus is configured to, in response to the sending of the scheduling request, receive an uplink grant indicating a fourth time at which the apparatus is scheduled to transmit the second uplink data, the fourth time being before the second time.

According to an example, the fourth time is before the second time.

According to an example, the apparatus is configured to determine the processing time for preparing the transport block based on a number of OFDM symbols associated with the transport block.

According to an example, a time period between the second time and the first time is reserved for building of the transport block.

According to an example, a time period between the first time and the second time comprises a network defined parameter.

According to a sixth aspect there is provided an apparatus comprising at least one processor, and at least one memory including computer program code, wherein the at least one memory and the computer program code are configured, with the at least one processor, to: send to a user equipment an uplink grant for transmitting first uplink data from the user equipment at a first time; and receive a scheduling request from the user equipment, the scheduling request indicating presence of second uplink data to be transmitted from the user equipment which has not been scheduled for transmission, the second uplink data comprising urgent data; and in response to the receiving a scheduling request, send an uplink grant indicating a second time at which the user equipment is scheduled to transmit the second uplink data, the second time being before the first time.

According to an example, a time period between the sending of the uplink grant for transmitting first uplink data and the second time comprises a network defined parameter.

BRIEF DESCRIPTION OF FIGURES

The invention will now be described in further detail, by way of example only, with reference to the following examples and accompanying drawings, in which:

FIG. 7 is a flow chart of a method according to an example; and

FIG. 8 is a flow chart of a method according to an example.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
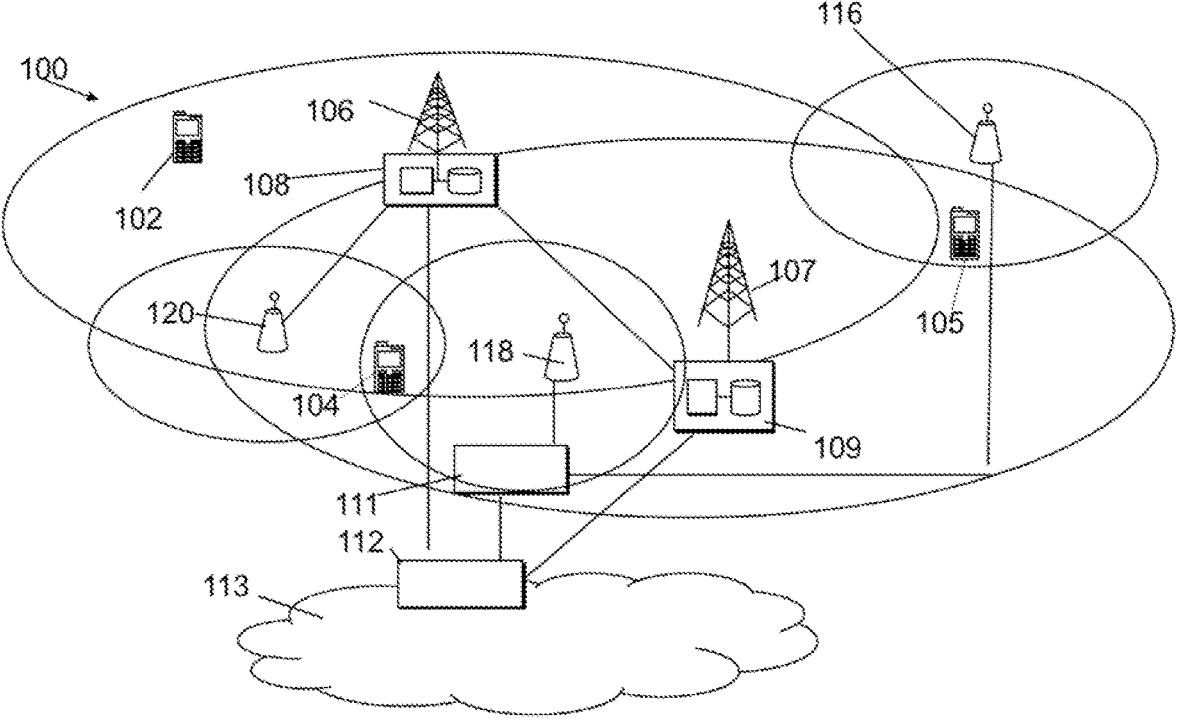
FIG. 1 shows a schematic example of a wireless communication system where the invention may be implemented.

In a wireless communication system 100, such as that shown in FIG. 1, a wireless communication devices, for example, user equipment (UE) or MTC devices 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
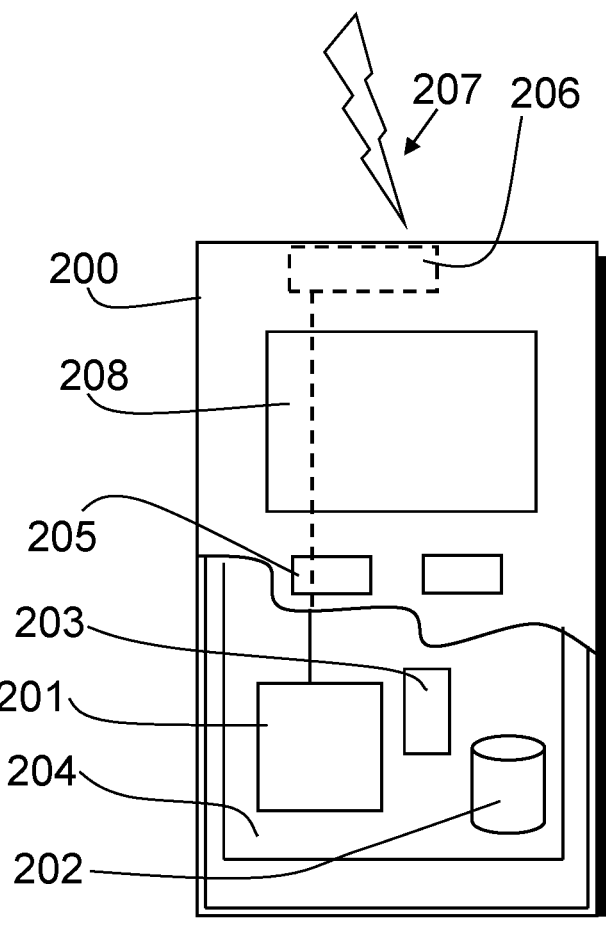
FIG. 2 shows an example of a communication device.

A possible wireless communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user equipment" are used to refer to any type of wireless communication device.

The wireless device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A wireless device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the wireless device by means of a suitable user interface such as key pad 205, voice commands, touch sensitive screen or pad, combinations thereof or the like. A display 208, a speaker and a microphone can be also provided. Furthermore, a wireless communication device may comprise appropriate connectors (either wired or wireless) to other devices and/or for connecting external accessories, for example hands-free equipment, thereto. The communication devices 102, 104, 105 may access the communication system based on various access techniques.

Figure 3:
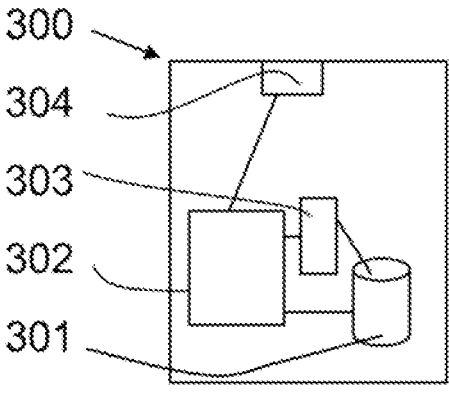
FIG. 3 shows an example of a control apparatus.

FIG. 3 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit or processor 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions.

Figure 4:
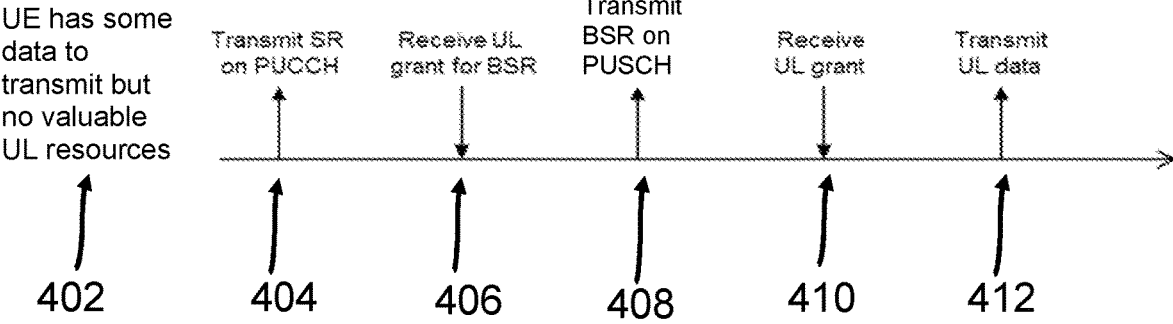
FIG. 4 is a timing diagram according to an example.

FIG. 4 shows a process by which a UE transmits data. As shown at 402, a UE has some data to transmit but no UL (uplink) resources enabling that data to be transmitted. Accordingly, at 404 the UE transmits a scheduling request (SR) on the physical uplink control channel (PUCCH). At 406, the UE receives a UL grant for a buffer status report (BSR), and at 408 the UE transmits the BSR on PUSCH. The BSR informs e.g. a base station of the data to be transmitted by the UE. Following on from this the UE receives an UL grant at 410, enabling the UE to transmit the UL data as shown at 412.

In the above process, for LTE, an SR is triggered in a transmission time interval (TTI) when there is no UL grant. This allows a triggered BSR to be transmitted in an uplink transport block (TB). However, for 5G new radio (NR) the intention is to remove "TTI" from the media access control (MAC) specification. Accordingly the timing between UL grant and SR triggering is unclear.

Furthermore, it has been agreed in RAN1 to introduce a parameter "K2". The parameter K2 indicates a time between Physical Downlink Control Channel (PDCCH) reception for UL grant and Physical Uplink Shared Channel (PUSCH) transmission. This may make the ambiguity period even longer than LTE. There could also be grant free (GF) or semi-persistent scheduling (SPS) grant, which may be referred to as configured grant, that do not need PDCCH for each UL grant.

RAN1 also agreed upon an "N2" value. The N2 value is a processing time required for UE processing from the end of NR-PDCCH containing the UL grant to the earliest possible start of the corresponding NR-PUSCH transmission. The processing time N2 may be based on or dependent on a number of orthogonal frequency-division multiplexing (OFDM) symbols, and may be different for different numerologies.

Therefore at least in part because of increased flexibility requirements, the present inventors have identified that the relationship between BSR trigger and SR trigger is unclear in NR. This could lead to unnecessarily long delays for the SR. For instance, with large K2 values, when a regular BSR is triggered at time point T1, an uplink grant available at T1+10 ms could prohibit the SR for 10 ms. There could also be cases where enhanced Mobile BroadBand (eMBB) data has triggered the previous SR, which gNB then provided the T1+l10 ms grant. Ultra-Reliable Low-Latency Communication (URLLC) data could come into the UE buffer in the meantime and would require much shorter latency.

As will be described in more detail below, the present application is related to timing associated with building a transport block (TB). In some examples the "building a TB" may refer to building of a MAC PDU. In some examples the UE builds the TB as close as possible to the actual PUSCH transmission. This maximizes the opportunity for an incoming or newly created BSR to be included in the TB for transmission. Furthermore, building the TB closer to the actual PUSCH transmission ensures the BSR/PHR (Power Headroom Report) reflects the latest status (for example there could be UL grant later on other carriers that should be reflected in PHR reporting). In an example the UE may start building the TB not earlier than:

$$T0+K2-N2$$

where T0 is the time where PDCCH for the UL grant is received; and
K2 is the time between PDCCH reception and PUSCH transmission; and
N2 is the UE processing time.

In an example, for a case of GF/SPS grant, the UE does not build the TB earlier than a time point of the UL grant minus the UE processing time. In an example, in general the equation above maps to the UE so that the UE does not build any TB earlier than a time point of the UL grant minus the UE processing time.

A further aspect disclosed relates to SR triggering. According to an example the SR is triggered on condition (and in some examples determination of the condition) that the BSR has not been included into a TB. For example if any BSR is triggered between time T0 and time T0+K2−N2, SR will be triggered.

According to some examples, by changing the reference or trigger condition from having UL resources to a determination of whether the BSR has been included in a TB and building the TB as late as possible, the issues described above regarding delays for the SR may be overcome.

In one example, where an LCH (Logical Channel) that triggered a regular BSR has not been assigned to any SR configuration (i.e. would trigger random access (RA) procedure inside the SR procedure if the SR is triggered), the SR would not be triggered. Alternatively, SR/RA procedure may be triggered but RA procedure is then aborted when the triggered BSR is included in the MAC PDU since the SR is cancelled.

According to some examples it is assumed the random access (RA) procedure will always take more time than the maximum grant to Tx time. Hence, in some examples the RA procedure is not triggered or aborted according to above examples.

Some examples will now be described in more detail with respect to FIGS. 5 and 6.

Figure 5:
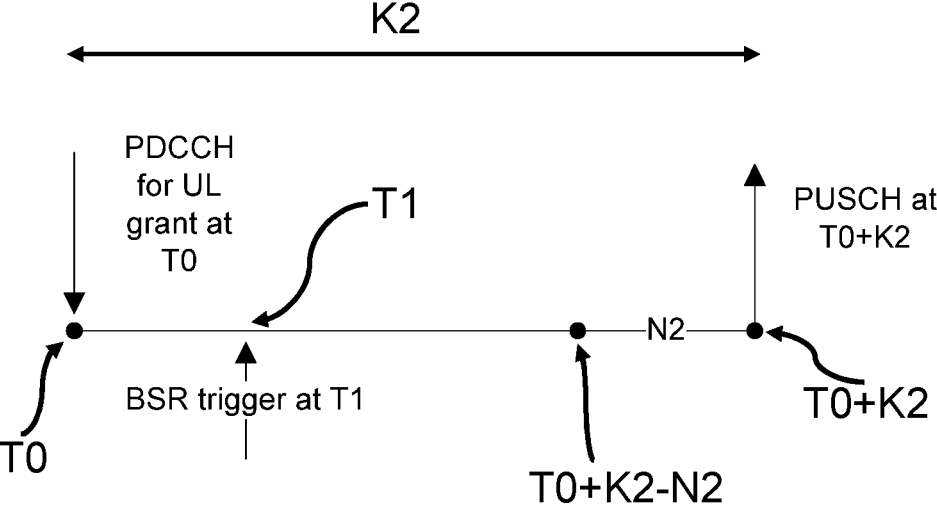
FIG. 5 is a timing diagram according to an example.

As shown in FIG. 5, a PDCCH for UL grant is received at time T0. The BSR is triggered at time T1. Transmission on the PUSCH occurs at time T0+K2. In examples the UE begins preparing a TB at time T0+K2−N2, which is the latest that the TB can be prepared and finished in time for transmission on PUSCH at time T0+K2, taking in to account processing time N2. Without the requirement of building the TB no earlier than T0+K2−N2, a UE implementation could build the TB at any time between T0 and T0+K2. When doing so, and as soon as the BSR is included in the TB, no SR will be triggered and the BSR transmission can only happen at T0+K2.

Figure 6:
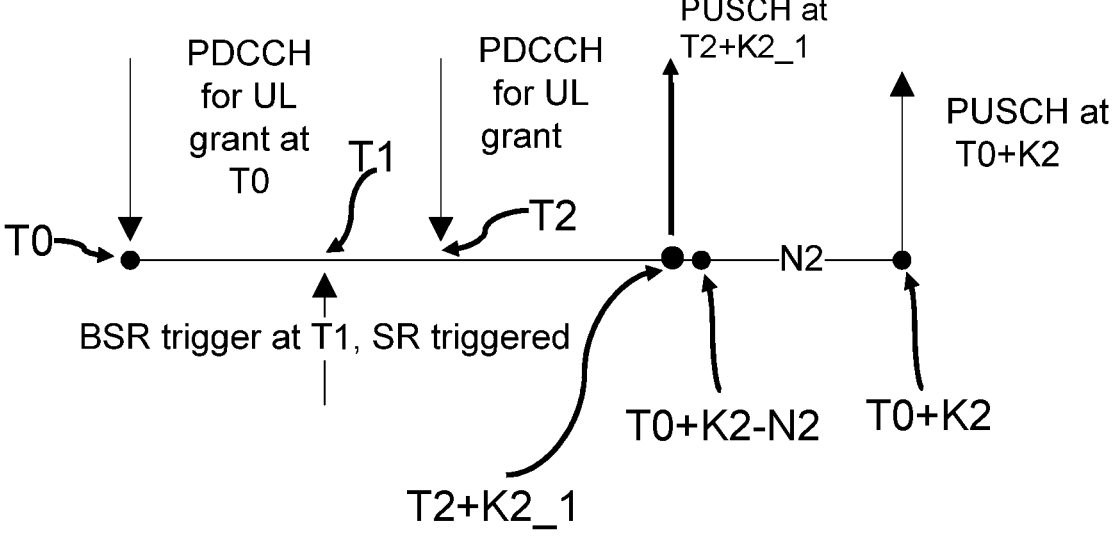
FIG. 6 is a timing diagram according to an example.

FIG. 6 shows a proposal where a base station (e.g. gNB) can receive the SR and allocate UL grant sooner than an already allocated PUSCH. This may occur, for example, when the SR indicates arrival of urgent service data (e.g. URLLC data) following an initial allocation of PUSCH.

As shown in FIG. 6, at time T0 PDCCH for UL grant is received. The PDCCH received at T0 effectively sets a time for PUSCH of T0+K2.

At time T1, a BSR is triggered indicating new data in UE buffer. In this example the new data comprises high priority or urgent service data (e.g. URLLC data). High priority or urgent data may be considered, in an example, data that needs to be transmitted in less than 10 ms. Therefore, at time T1 the SR is triggered and sent to the gNB. In some examples the SR is triggered in response to determination that (a) the new data associated with the BSR comprises high priority or urgent service data or higher priority data compared to data which is already available for transmission, and (b) a determination that the BSR is yet to be included in any TB.

In response to the triggered SR at T1, a PDCCH for UL grant is received at time T2 which is after time T1. In view of the urgent data in the buffer this causes a PUSCH on which the urgent data can be transmitted to be scheduled for a time T2+K2_1. In this example K2_1 is a shorter time than K2. Therefore in this example the urgent data is transmitted at a time T2+K2_1 which occurs before time T0+K2. Accordingly the urgent data is transmitted sooner than it ordinarily would have been had it utilised the standard procedure and been transmitted at time T0+K2.

According to the described examples, some embodiments ensure that the BSR reflects the most recent status of the UE buffer once received in the gNB. According to some examples the time period between T0+K2−N2 and T0+K2 is reserved for TB building.

According to the described examples, some embodiments ensure that the SR may be transmitted for possible other services even though there may be a UL grant for another service available which may not be suitable. This may lead to improved quality of service (QoS).

For further understanding the method is further explained with respect to the flow charts of FIGS. 7 and 8.

FIG. 7 is a flow chart showing a method viewed from a perspective of a user equipment, which will be described in conjunction with the timing diagram of FIG. 6.

The method comprises, at S1, receiving at a user equipment an uplink grant for transmitting first uplink data from the user equipment at a first time (T0+K2).

The method comprises, at S2, determining a second time (T0+K2−N2) for initiating preparation of a transport block for transmitting the first uplink data, the determining a second time comprising subtracting a processing time for preparing the transport block (N2) from the first time (T0+K2).

The method may include determining, at a third time (T1) which is between the receiving the uplink grant and the initiating preparation of a transport block, a presence of second uplink data to be transmitted from the user equipment which has not been scheduled for transmission, the second uplink data comprising urgent data and the presence of the second uplink data triggering a buffer status report, and in response to the buffer status report triggering a scheduling request from the user equipment.

The method may include the second uplink data being stored in a buffer of the user equipment.

The method may include, in response to the sending of the scheduling request, receiving an uplink grant indicating a fourth time (T2+K2_1) at which the user equipment is scheduled to transmit the second uplink data, the fourth time being before the second time (T0+K2).

The method may include the fourth time (T2+K2_1) being before the second time (T0+K2-N2).

The method may include determining the processing time for preparing the transport block based on a number of OFDM symbols associated with the transport block.

The method may include a time period between the second time (T0+K2−N2) and the first time (T0+K2) being reserved for building of the transport block.

The method may include a time period between the first time (T0) and the second time (T0+K2) comprising a network defined parameter (K2).

FIG. 8 is a flow chart showing a method viewed from a perspective of a base station, which will be described in conjunction with the timing diagram of FIG. 6.

The method comprises, at S1, sending to a user equipment an uplink grant for transmitting first uplink data from the user equipment at a first time (T0+K2).

The method comprises, at S2, receiving a scheduling request from the user equipment, the scheduling request indicating presence of second uplink data to be transmitted from the user equipment which has not been scheduled for transmission, the second uplink data comprising urgent data.

The method comprises, at S3, in response to the receiving a scheduling request, sending an uplink grant indicating a second time (T2+K2_1) at which the user equipment is scheduled to transmit the second uplink data, the second time being before the first time (T0+K2).

The method may comprise a time period between the sending of the uplink grant for transmitting first uplink data and the second time comprising a network defined parameter (K2).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:

receiving at a user equipment an uplink grant for transmitting first uplink data from the user equipment at a first time, wherein the uplink grant is a configured grant; and building a transport block for transmitting the first uplink data at the first time, wherein the building of the transport block is started not earlier than the first time minus a processing time for preparing the transport block at the user equipment.

2. The method of claim 1, further comprising:

determining the processing time for preparing the transport block based on a number of orthogonal frequency division multiplexing (OFDM) symbols.

3. The method of claim 1, wherein a time period between the first time minus the processing time and the first time is reserved for building of the transport block.

4. The method of claim 1, wherein the first time minus the processing time is the latest in time for the transport block to be prepared for transmitting the first uplink data at the first time.

5. The method of claim 1, wherein the transport block reflects the most recent status in reporting included in the transport block.

6. The method of claim 5, wherein the reporting comprises at least one of buffer status reporting and power headroom reporting.

7. The method of claim 1, wherein the processing time is different for different numerologies.

8. The method of claim 1, wherein the configured grant is a grant free grant or a semi-persistent scheduling grant.

9. The method of claim 1, wherein the first uplink data is transmitted on the Physical Uplink Shared Channel (PUSCH).

10. The method of claim 1, further comprising:

awaiting the first time minus the processing time before the building of the transport block is started.

11. The method of claim 1, further comprising:

awaiting the first time minus the processing time before starting the building of the transport block to ensure that a power headroom report (PHR) included in the transport block reflects the latest status.

12. The method of claim 1, further comprising:

although the user equipment is capable of building the transport block earlier, awaiting the first time minus the processing time before starting the building of the transport block.

13. The method of claim 1, further comprising, although the user equipment is capable of building the transport block earlier, awaiting the first time minus the processing time before starting the building of the transport block to ensure that a power headroom report (PHR) included in the transport block reflects the latest status.

14. An apparatus comprising:

at least one processor; and at least one memory including computer program code, wherein the at least one memory and the computer program code are configured, with the at least one processor, to cause the apparatus at least to:

receive, at the apparatus, an uplink grant for transmitting first uplink data from the apparatus at a first time, wherein the uplink grant is a configured grant; and build a transport block for transmitting the uplink data at the first time, wherein the building of the transport block is started not earlier than the first time minus a processing time for preparing the transport block at the apparatus.

15. The apparatus of claim 14, wherein the at least one memory and the computer program code are configured, with the at least one processor, to cause the apparatus at least to:

determine the processing time for preparing the transport block based on a number of orthogonal frequency division multiplexing (OFDM) symbols.

16. The apparatus of claim 14, wherein the processing time is reserved for building of the transport block.

17. The apparatus of claim 14, wherein the first time minus the processing time is the latest in time for the transport block to be prepared for transmitting the first uplink data at the first time.

18. The apparatus of claim 14, wherein the transport block reflects the most recent status in reporting included in the transport block.

19. The apparatus of claim 18, wherein the reporting comprises at least one of buffer status reporting and power headroom reporting.

20. The apparatus of claim 14, wherein the processing time is different for different numerologies.

21. The apparatus of claim 14, wherein the configured grant is a grant free grant or a semi-persistent scheduling grant.

22. The apparatus of claim 14, wherein the first uplink data is transmitted on the Physical Uplink Shared Channel (PUSCH).

23. The apparatus of claim 14, wherein the at least one memory and the computer program code are configured, with the at least one processor, to cause the apparatus at least to:

await the first time minus the processing time before the building of the transport block is started.

24. The apparatus of claim 14, wherein the at least one memory and the computer program code are configured, with the at least one processor, to cause the apparatus at least to:

await the first time minus the processing time before starting the building of the transport block to ensure that a power headroom report (PHR) included in the transport block reflects the latest status.

25. The apparatus of claim 14, wherein the at least one memory and the computer program code are configured, with the at least one processor, to cause the apparatus at least to:

although being capable of building the transport block earlier, await the first time minus the processing time before starting the building of the transport block.

26. The apparatus of claim 14, wherein the at least one memory and the computer program code are configured, with the at least one processor, to cause the apparatus at least to:

although being capable of building the transport block earlier, await the first time minus the processing time before starting the building of the transport block to ensure that a power headroom report (PHR) included in the transport block reflects the latest status.

27. A non-transitory computer-readable medium storing instructions that, when executed by a processor, cause a user equipment to carry out at least the following:

receiving, at the user equipment, an uplink grant for transmitting first uplink data from the user equipment at a first time, wherein the uplink grant is a configured grant; and building a transport block for transmitting the first uplink data at the first time, wherein the building of the transport block is started not earlier than the first time minus a processing time for preparing the transport block at the user equipment.

* * * * *